United States Patent [19]

Suzuki

[11] Patent Number: 4,734,681

[45] Date of Patent: Mar. 29, 1988

[54] SENSOR FOR DETECTING CONDITION IN SLURRY TRANSPORT LINE OF WET BLASTING APPARATUS

[75] Inventor: Hidemasa Suzuki, Shizuoka, Japan

[73] Assignee: Fuji Seiki Machine Works, Ltd., Shizuoka, Japan

[21] Appl. No.: 882,076

[22] Filed: Jul. 3, 1986

[30] Foreign Application Priority Data

Nov. 13, 1985 [JP] Japan ................................ 60-173564

[51] Int. Cl.⁴ ................................................ G08B 21/00

[52] U.S. Cl. ........................................ 340/608; 73/37; 239/71

[58] Field of Search .................. 340/608; 73/649, 658, 73/37, 168; 239/71

[56] References Cited

U.S. PATENT DOCUMENTS 4,313,111 1/1982 Anderson ........................ 340/608 X 4,430,886 2/1984 Rood ........................................ 73/37

4,668,948 5/1987 Merkel ................................ 73/37 X

FOREIGN PATENT DOCUMENTS 2529808 1/1984 France .................................. 239/71

*Primary Examiner*—Stewart J. Levy

*Assistant Examiner*—Joseph W. Roskos

*Attorney, Agent, or Firm*—Flynn, Thiel, Boutell & Tanis

[57] ABSTRACT

Apparatus for sensing the condition of a slurry transport line in a wet blasting apparatus. Slurry transportation lines feed the blasting guns of a wet blasting machine. The blasting guns are carried by a gun supporting member by means of interposed resilient members for isolating each gun from the vibration of adjacent guns. A vibration sensor fixed on the nozzle of each gun provides an electric output signal to a measuring device related to the amount of vibration of the gun on which said sensor is mounted.

5 Claims, 9 Drawing Figures

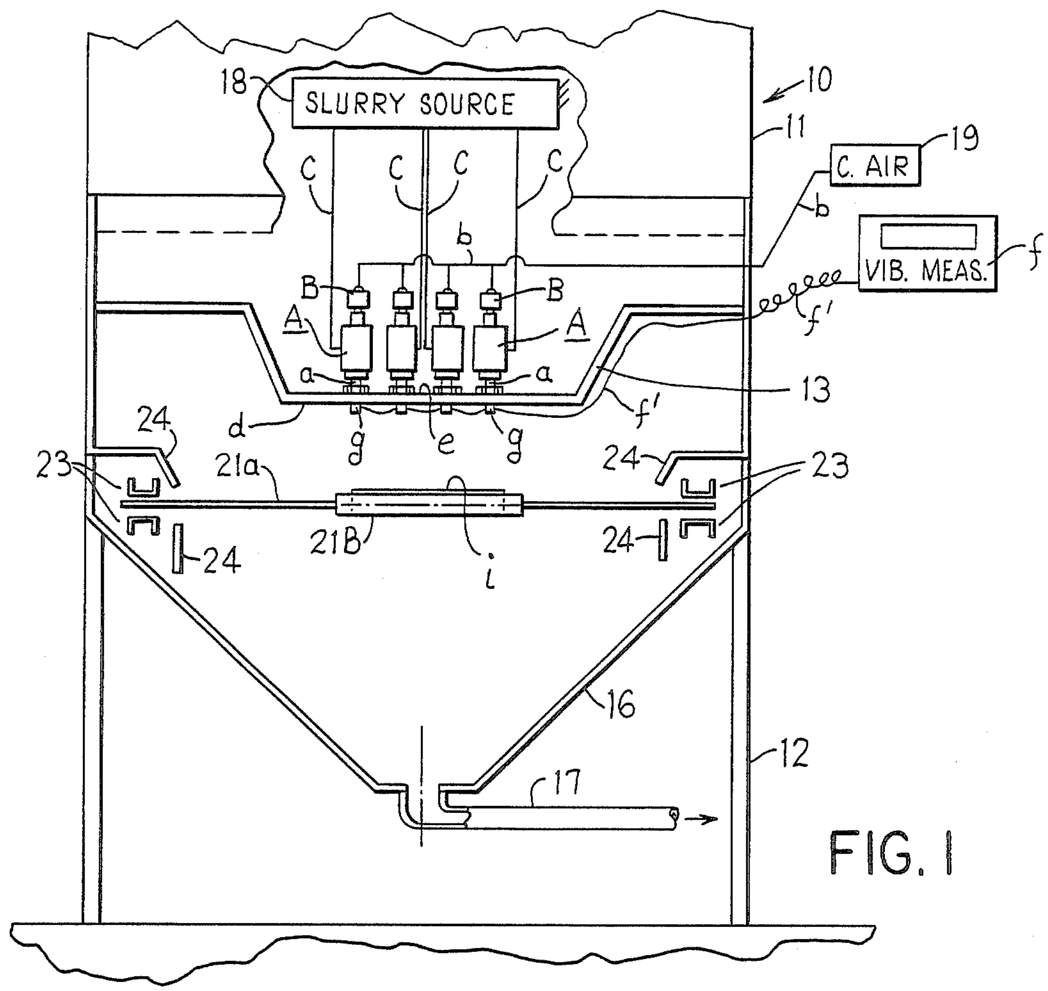
FIG. 1
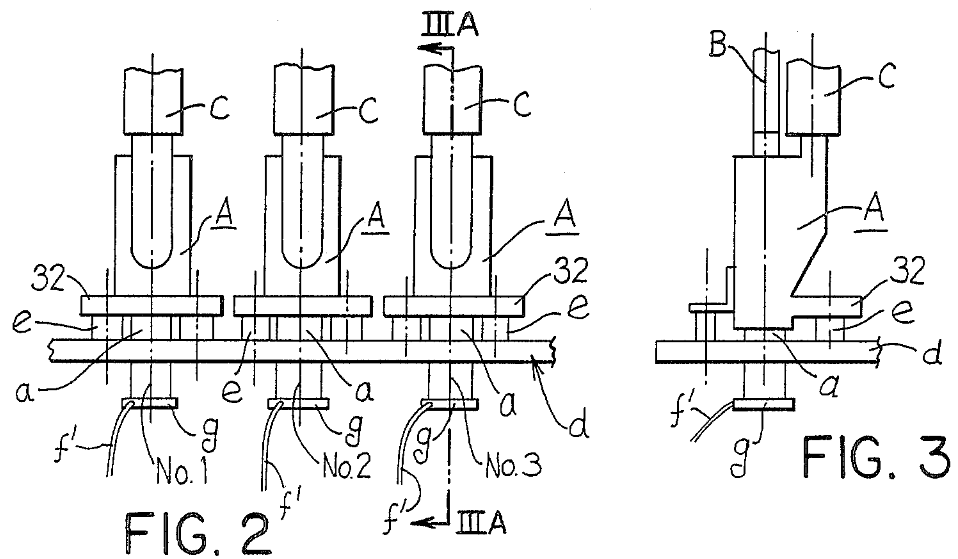
FIG. 2
FIG. 3

C
B
A
61
62
68
70
29
36
32
31
e
28
72
32
63
e
d
d
33
30
26
66
64
a
f'
g
74

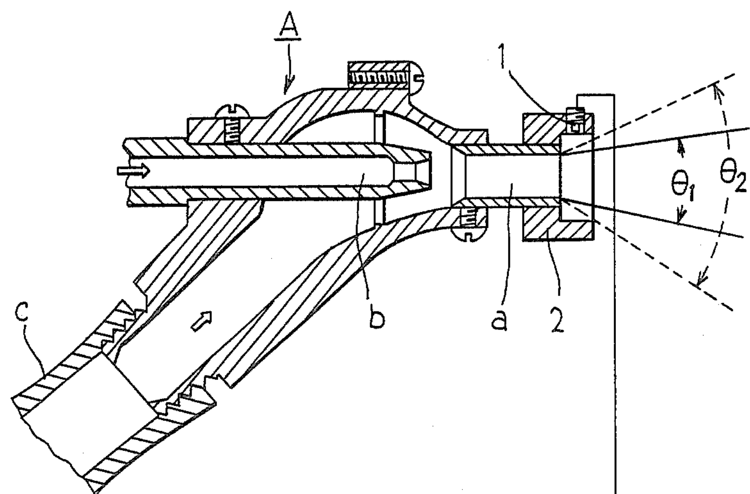
FIG. 6
PRIOR ART
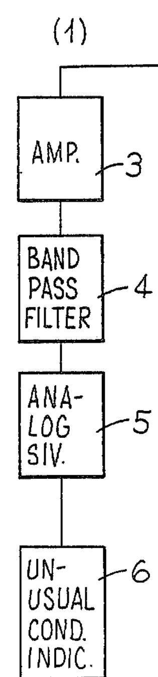

SENSOR FOR DETECTING CONDITION IN SLURRY TRANSPORT LINE OF WET BLASTING APPARATUS

FIELD OF THE INVENTION

This invention relates to apparatus for detecting the condition in the slurry transportation line of a wet blasting machine, and more particularly relates to a sensing apparatus which can detect an unusual flow condition in the slurry line to a given blasting gun.

BACKGROUND OF THE INVENTION

It happens occasionally in a wet blasting machine, when concentration of the slurry is heavy, or the mass of abrasive particles is heavy, that the blasting operation cannot be performed normally due, for example, to foreign material accidentally mixed in the slurry hindering the slurry flow or clogging the pipe of the slurry line. Such hindrance or clogging interposes a heavy load on the motor of the slurry pump. On the other hand, as wet blasting methods have progressed toward being more and more automated, it is required that the blasting operation always provide consistent and reproducible results. Accordingly, supervision of the slurry flow becomes necessary, because an uneven flow of slurry causes uneven performance and thus nonuniform results.

The assignee of the present invention has a sensing device which can detect an unusual condition of the slurry transportation line in a wet blasting machine. Such device is shown in Japanese provisional publication of Utility patent No. 60-131358 and in FIG. 6 of the present application. As seen in FIG. 6, such device comprises a vibration sensor 1 fixed inside an adapter 2, which adapter 2 is fixed at any desired location on a slurry transportation line up to and including the blasting gun thereof, such a blasting gun being shown at A in appended FIG. 6. The sensor 1 provides an electric output of frequency corresponding to the frequency of vibration to which it is subjected. The output signal of sensor 1 is applied to a series circuit path comprising an amplifier 3, band pass filter 4, analog switch 5 and an indicator 6. The band pass filter 4 eliminates from the electric output signal of the sensor 1 the frequency component representing the vibration frequency received by the vibration sensor 1 due to the normal flow of slurry. The signal outputted by the filter contains the frequency component due to the abnormal slurry line condition, if any.

Considering more specifically the foregoing device, the vibration sensor 1, disposed inside of the adapter 2 which is fixed in some location in the slurry transportation line (including the blasting gun A), detects all vibration in the slurry line and converts it to a corresponding frequency electric signal. The detected frequency electric signal passes through the amplifier 5 to the band pass filter 4, which eliminates the frequency component delivered to the filter when slurry flows normally at the location of the sensor 1. Frequencies other than the eliminated frequency are sent by the filter 4 to the analog switch 5. If the voltage of the filter output frequency signal exceeds a threshold voltage preset in the switch 5 (or the amplitude of the vibration is larger than a predetermined value), the switch 5 sends outputs to the abnormal condition indicator 6 which is thereby activated. The indicator 6 may thus be, for example, a light or audible alarm which is normally turned off but is turned on by said abnormal condition output from switch 5. If the vibration sensor 1 at the nozzle a detects a noise generated by ejection only of compressed air, rather than the noise normally generated by normal flow of the slurry due to normal slurry pump pressure, the abnormal condition indicator 6 of the foregoing device actuates. By such construction, clogging or hindrance in the slurry transportation line is easily detected. On the other hand, the foregoing device disadvantageously has numerous constituent parts.

Also, in wet blasting operations there are very often cases where the operator should be informed if there is clogging in the slurry line before he starts the machine, or if blasting can be done consistently.

The objects and purposes of the present invention include providing a sensing device for detecting unusual conditions in the slurry transportation line of a wet blasting machine which is of more simple construction and which is intended to meet the abovementioned demand for information.

SUMMARY OF THE INVENTION

The objects and purposes of the invention are met by providing a sensing apparatus in the slurry transportation line of a wet blasting machine in which the blasting guns are supported by a gun supporting member with resilient means isolating each gun from the vibration generated by the other guns, and wherein the vibration sensor attached to each gun drives a measuring device.

BRIEF DESCRIPTION OF THE DRAWINGS

FIG. 1 is a cross-sectional schematic view of the front part of a wet blasting machine incorporating an improvement according to the present invention.

FIG. 2 is an enlarged front view of three of the blasting guns of the FIG. 1 machine.

FIG. 3 is a side view of FIG. 2.

FIG. 6 is a drawing of a prior device which is disclosed in Japanese provisional patent publication 60-131358, abovementioned.

DETAILED DESCRIPTION

Figure 3A:
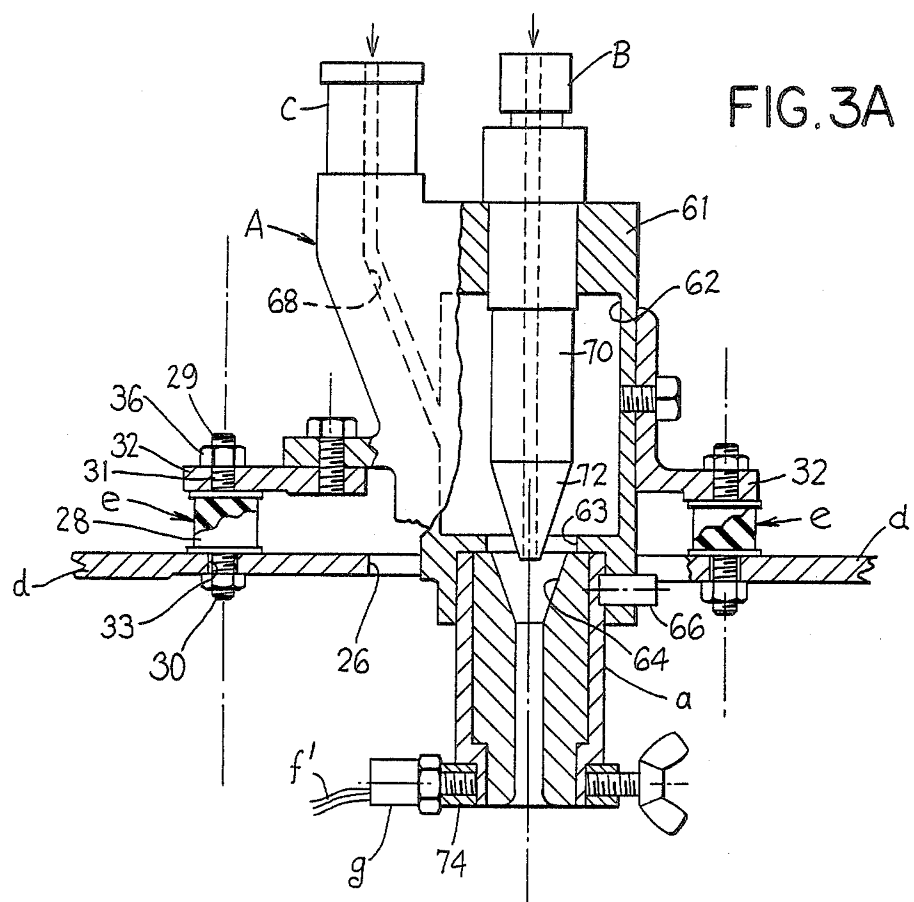
FIG. 3A is an enlarged cross-sectional view substantially taken on the line IIIA—IIIA of FIG. 2 and showing the resilient member usable for mounting the guns of FIGS. 1–3.

A preferred embodiment of the invention is illustrated in FIG. 1, FIG. 2 and FIG. 3.

FIG. 1 shows a somewhat schematic front cross-sectional view of a wet blasting machine. The wet blasting machine 10 comprises a housing 11 supported on an upstanding framework 12. The deck 13 extends transversely across the interior width of the housing 11 at an intermediate height therein. The central portion of the deck 13 defines a gun supporting plate d which, in the embodiment shown in FIG. 1, is depressed downward below the level of the remaining portion of the deck 13. A plurality of slurry blasting guns A (in the embodiment shown, two pairs of such guns A) are supported by means hereafter described in upstanding relation on the supporting plate d of deck 13. The guns A are laterally spaced along the supporting plate d. Each gun A has a blasting nozzle a which projects downward therefrom and is aimed downward toward the bottom of the housing 11. The manner in which the guns A are supported on the supporting plate d is discussed hereafter.

The housing 11 has a troughlike bottom wall 16 spaced below the downward aimed gun nozzles a. The depressed central portion of the bottom wall 16 drains into a drain conduit 17 for removing used slurry and waste material removed from workpieces by such slurry from the housing 11. The material exiting through the drain conduit 17 can be, by any convenient means, sent to waste or recycled, as desired.

A slurry source 18, here fixed in the housing 11 in spaced relation above the guns A, supplies slurry through individual slurry supply lines c to respective ones of the guns A. The slurry source 18 preferably comprises a conventional slurry pump drawing slurry from a suitable reservoir to pass it through the lines c to the guns A. A compressed air source 19 supplies compressed air through compressed air lines b to each of the guns A, so that slurry coming through the slurry supply line c is blasted from the blasting guns A by the compressed air from compressed air lines b downward through the nozzles a toward the central portion of the bottom wall 16 of the housing 11.

Interposed between the nozzles a and the bottom wall 16 of the housing 11 is a conveyor 21*a* which in normal operation moves in a direction into the page in FIG. 1. The central portion 21*b* of the conveyor 21*a* supports a workpiece i in spaced relation below the downward aimed gun nozzles a for being blasted with slurry therefrom, for example to clean unwanted material from the workpiece i. To assist in guiding motion of the conveyor 21*a* through the housing 11, longitudinal guides 23 are provided at the left and right edges of the conveyor 21*a*. In the embodiment shown, the guides 23 are protected from contact with the slurry by shields 24 within the housing 11.

Although conveyors of various conventional kinds (such as the main conveyor 57 in U.S. Pat. No. 4,561,219 assigned to the assignee of the present invention) may be used, in the embodiment shown by way of example in FIG. 1, the conveyor may be a roller conveyor on which a flat workpiece i is set. Conventional structure associated with the conveyor is omitted from FIG. 1 to avoid unnecessary clutter therein. Conventional means not shown may be provided for placing workpieces i upon the central conveyor portion 21*b* prior to processing and removing workpieces therefrom after processing. Aforementioned U.S. Pat. No. 4,561,219 shows an example.

To the extent above-described, the foregoing apparatus may be conventional. In the embodiment shown, each gun A comprises a body 61 having a slurry chamber 62 with a port 63 in the bottom thereof opening to a funnel-like central vertical outlet 64 in the nozzle a, which nozzle a is fixed to the bottom of body 61 at 66. A slurry passage indicated in broken line at 68 communicates from the slurry line c to the chamber 62. A conduit 70 communicates with the compressed air line b and extends into the slurry chamber 62 and has a tapered bottom end 72 extending through the bottom opening 63 part way into the funnel-shaped upper end of the funnel-shaped passage 64 in the nozzle a. Thus, slurry flowing into the slurry chamber 62 from the slurry line c and passage 68 is forcibly projected, or blasted, downwardly out of the funnel-shaped passage 64 in the nozzle a by the force of compressed air moving from compressed air line b downward through the tapered bottom end 72 of the conduit 70.

Turning now more particularly to the portion of the disclosed apparatus more directly concerned with the present invention, as best seen in FIGS. 2, 3 and 3A, the slurry and blasting guns A are each supported on the gun supporting plate d by vibration isolating, resilient (e.g., rubber or the like) members e. Each gun A is spaced from the gun supporting plate d by such resilient members e. Further, the nozzle a of each gun A extends loosely (in substantial clearance relation) through a corresponding hole 26 in the gun supporting plate d. Thus, the gun A does not directly touch the gun supporting plate d or other parts of the housing 11 and thus cannot transmit vibration to or absorb vibration from other ones of the guns A, to any significant extent. The resulting vibrational isolation of each gun A is enhanced by making the slurry lines c and compressed air lines b elongate and of resiliently flexible material, such as rubber or the like.

As seen in FIG. 3A, one embodiment of the resilient member e comprises a resilient block 28. Fixed to the top and bottom ends of the resilient block 28 are the heads of bolts 29 and 30. The bolt 29 extends upwardly through a hole 31 in a lateral flange 32 protruding from an intermediate portion of the gun A. The bolt 30 protrudes downward through a hole 33 in the gun supporting plate d. Nuts 36 secure the bolts 29 and 30 to the flange 32 and plate d respectively. In the embodiment shown in FIG. 3A, the heads of the bolts 29 and 30 are wide and flat for maximum surface contact with the block 28 and are secured thereto by any convenient means such as vulcanizing or adhesive bonding. It is also contemplated that the resilient members e may be arranged in vertical tension (rather than compression as in FIGS. 3 and 3A), by providing suitable supports upstanding from the plate d in overhanging spaced relation above the flanges 32 of the gun A, with the bolts 29 and 30 of the resilient members e fixed to the overhanging supports and flanges 32, respectively.

A vibration sensor g is fixed to the lower end of the nozzle a of each gun A. The vibration sensor g is here threadedly fixed to a ring 74 in turn telescoped on the bottom end of the nozzle a and fixed thereto by a wing handled set screw 76 capable of providing a vibration waveform display. Each vibration sensor g is connected electrically by wiring f' to an electric vibration measuring instrument, such as an oscillograph, f (FIG. 1). The vibration sensor g may for example be a Model No. GA-313A, and the electric vibration signal measuring, or display, instrument f may be a Model No. GA-245, both manufactured by Lead Electric Co., located at Osaka, Japan. The device f in one embodiment of the invention included means for reproducing in visible form the voltage waveforms seen in appended FIGS. 4 and 5, and hereafter discussed.

While the operation of the apparatus will be understood from the foregoing description, same will be summarized below for convenient reference. Slurry coming from the slurry source 18 through the slurry supply lines c is blasted downward from the nozzles a of the blasting guns A by the compressed air from the compressed air supply lines b. The slurry blasted from the guns nozzles a forcibly strikes the upper surface of the workpiece i located therebeneath to remove unwanted material, such as flash and scale.

As the guns blast slurry toward the workpiece i, such guns A vibrate and these vibrations are an indication of whether or not a slurry line c (and/or its particular gun A) is clogging at any given time. The vibration of each blasting gun A is sensed by its corresponding vibration sensor g, which converts the vibration to an electrical (e.g., voltage) waveform, which is applied through the wiring f' to the vibration measuring unit f. The measuring device f reproduces the waveform of the vibration as a visible waveform (as for example in FIGS. 4 and 5). Each gun A is isolated from the vibration of the other guns by the vibration isolating, resilient members e supporting each gun A on the gun supporting plate d. Thus, the vibration sensed by each vibration sensor g is the vibration of its own particular gun A, without contamination by vibration of any of the other guns A.

In one operating example, a slurry of abrasive particles, namely glass beads of mesh size No. 80, mixed in the ratio of 30% glass beads and 70% water in the slurry source 18, was blasted from the nozzles a of the guns A with compressed air. For purposes of experimentation, seven different air pressures in the range of 1.5 kg/cm$^2$ to 4.5 kg/cm$^2$ were used in sequence. The circuit of one gun A was artificially clogged. This enabled a comparison of operation where one gun is clogged and operation (normal) where there is no clogging.

Figure 4B:
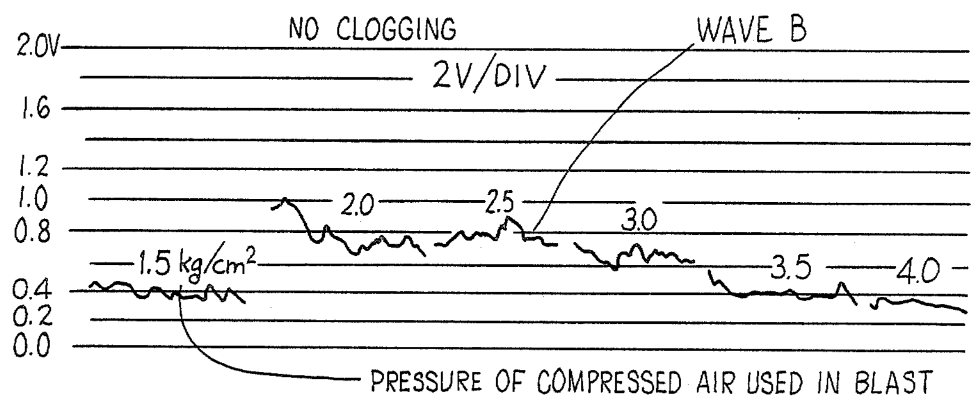
FIGS. 4A and 4B show vibration waveforms of the No. 1 gun of the FIG. 1 machine, and respectively show that clogging exists (wave A) and clogging does not exist (wave B).
Figure 4A:
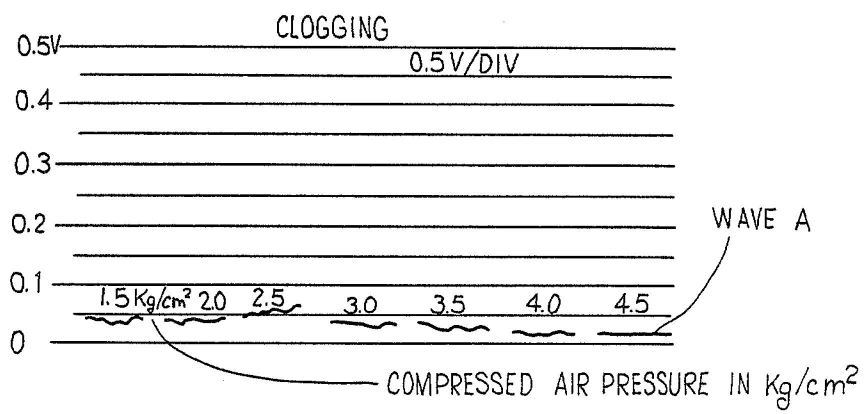

The result of this experiment is shown in FIG. 4 which shows the voltage waveform plot of device f in respect to left side gun No. 1 in FIG. 3. FIG. 3 part A shows the voltage displayed by device f as to the voltage output of gun No. 1 at excessively increased air pressures (1.5 to 4.5 kg/cm$^2$) applies through line c when clogging is present, FIG. 4B showing a corresponding output for gun No. 1 when it is not clogged. It is apparent from FIG. 4 that when gun No. 1 is not clogged, the voltage displayed by the measuring device f lies in the range from 0.2 to 1.0 volt. However, when gun No. 1 is clogged the measuring device f displays a voltage in the range between 0.0 and 0.1 volt. Accordingly, by the indicated amplitude of the vibration electric signal, the clogging of gun No. 1 is readily apparent.

Figure 5B:
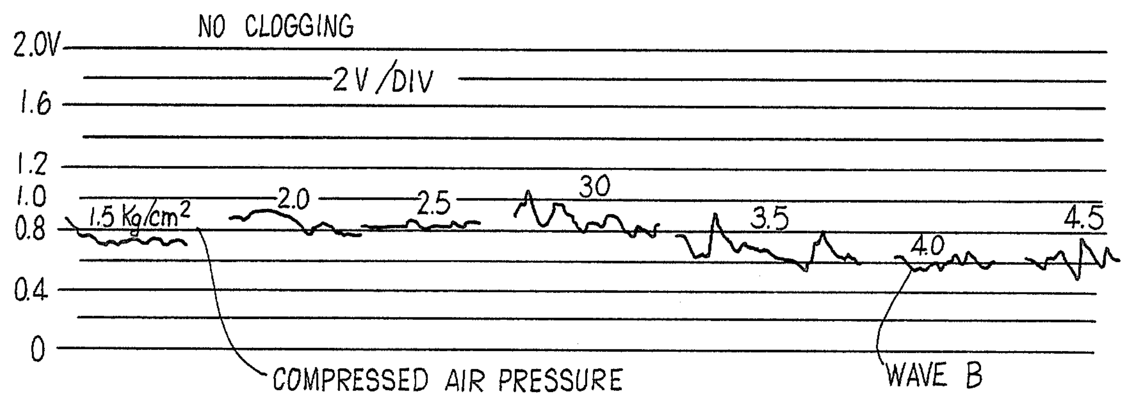
FIGS. 5A and 5B show vibration waveforms of the No. 2 gun of the FIG. 1 machine, and respectively show that clogging exists (wave A) and clogging does not exist (wave B).
Figure 5A:
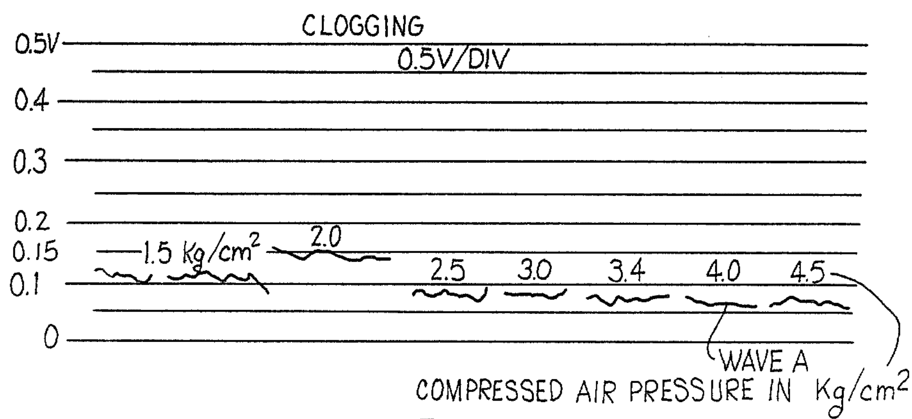

FIG. 5 is similar to FIG. 4 but provides a comparison of the output display of measuring device f for the clogged and unclogged condition of FIG. 3 gun No. 2 (namely the gun in the middle of the three guns shown in FIG. 3). In FIG. 5 where blasting gun No. 2 is not clogged, the display of measuring device f provides a voltage in the range 0.4–1.0 volt. However, when gun No. 2 is clogged, the display of measuring device f is a voltage in the range of 0.0–0.15 volt. Again, the clogged and unclogged condition of gun No. 2 can readily be seen from a comparison of the display voltage of the measuring device f.

Accordingly, the measuring device f will indicate the presence of clogging, and distinguish it from the absence of clogging, in a slurry line c. However, to determine which slurry line c is clogged, the apparatus of the present invention vibrationally isolates the guns A from each other so that the measuring device f will produce a clogging type voltage characteristic (as in FIG. 4A or 5A) only for the particular gun A whose individual slurry line c is actually clogged. It is contemplated that the measuring device f may be of a kind which simultaneously displays in separate fields thereon the instantaneous vibration characteristics of all of the guns A. Alternately, the measuring device f may be electrically switched from one gun vibration sensor g to the next so as to display the vibration characteristics of the guns A one at a time in any desired sequence.

It will be noted that the display of the measuring device f, as seen in FIGS. 4 and 5, is a voltage display which is directly related to the vibration amplitude experienced by the corresponding vibrations sensor g, the gun vibrating less when its incoming slurry line c is clogged than when it is not clogged. The inventive device effectively shows the presence or absence of clogging in a slurry line c, yet is of simple and reliable construction.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. Sensing apparatus for detecting the condition of a slurry transport line of a wet blasting machine, comprising:

blasting guns connected to the slurry transportation line and each having a nozzle for projecting slurry supplied thereto through said slurry transportation line;

a gun supporting member for supporting said blasting guns in a position of use;

vibration isolating, resilient means supporting each said gun on said gun supporting member while isolating each gun from vibration of the other gun or guns;

a vibration sensor having an electric output changeable with vibration applied to said vibration sensor, said vibration sensor being fixed on one of said guns for monitoring the vibration thereof and thereby the condition of the slurry transport line to said gun;

an electric measuring device driven by said vibration sensor for indicating a characteristic of the vibration of said gun and thereby indicating the condition of the slurry transportation line feeding said gun.

2. The apparatus of claim 1 in which said nozzles of said guns protrude loosely through holes in said gun supporting member, the part of each gun connected to a slurry transportation line being on one side of said gun support member and the outlet of said nozzles being on the other side of said gun support member, said vibration sensor being attached to the outlet end of said nozzle, an intermediate part of each said gun connecting through said resilient means to said gun supporting plate, such that each gun is free to vibrate without imparting said vibration to adjacent guns.

3. The apparatus of claim 2 including laterally projecting flange means on said guns disposed in overlapping spaced relation with said gun supporting plate, said resilient means comprising a resilient member interposed between said flange and gun support member and fastening means connecting spaced-apart portions of said resilient member to said flange means and gun supporting member respectively.

4. The apparatus of claim 3 in which said flange on said gun extends over said hole in said gun supporting member, each said gun having plural ones of said resilient members flanking said hole.

5. The apparatus of claim 1 in which the measuring device is an electric oscillograph and provides a graphical display of voltage versus time, said voltage being proportional to the amplitude of vibration of said gun nozzle.

* * * * *